(12) United States Patent
Martini et al.

(10) Patent No.: US 8,600,615 B2
(45) Date of Patent: Dec. 3, 2013

(54) VEHICLE CABIN WARM-UP

(75) Inventors: Ryan D. Martini, Wolverine Lake, MI (US); Anthony H. Heap, Ann Arbor, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 13/363,814

(22) Filed: Feb. 1, 2012

(65) Prior Publication Data

US 2013/0197749 A1 Aug. 1, 2013

(51) Int. Cl.
*G06F 7/00* (2006.01)

(52) U.S. Cl.
USPC .................. 701/36; 701/22; 701/99; 701/101; 180/65.1; 180/65.21; 180/65.265; 180/65.28; 903/902

(58) Field of Classification Search
USPC ........... 701/1, 22, 36, 99, 101, 102; 180/65.1, 180/65.21, 65.265, 65.275, 65.28; 903/902
See application file for complete search history.

(56) References Cited

U.S. PATENT DOCUMENTS

| | | | |
|---|---|---|---|
| 2008/0125934 A1* | 5/2008 | Chen et al. | 701/36 |
| 2011/0004392 A1* | 1/2011 | Senda et al. | 701/102 |
| 2011/0276210 A1* | 11/2011 | Tanaka | 701/22 |
| 2011/0288713 A1* | 11/2011 | Pursifull et al. | 701/22 |

\* cited by examiner

*Primary Examiner* — Rami Khatib

(74) *Attorney, Agent, or Firm* — Quinn Law Group, PLLC

(57) ABSTRACT

A method of heating a cabin in a hybrid vehicle having an internal combustion engine employing a coolant to remove engine heat, and a heating ventilation and air conditioning (HVAC) system using the coolant to heat the cabin is disclosed. The method includes detecting a request to achieve a predetermined temperature inside the cabin. The method also includes selecting a first baseline mode of engine operation to supply thermal energy to the coolant, and selecting a second mode of engine operation to supply additional thermal energy to the coolant if the predetermined temperature has not been achieved via the first mode of operation. The method additionally includes selecting a third mode of engine operation if the predetermined temperature has not been achieved via the second mode of operation. The predetermined temperature may also be maintained by supplying thermal energy to the coolant after the predetermined temperature has been achieved.

18 Claims, 1 Drawing Sheet

VEHICLE CABIN WARM-UP

TECHNICAL FIELD

The present disclosure is drawn to a prioritization scheme for warm-up of a cabin in a motor vehicle.

BACKGROUND

A majority of modern motor vehicles employ internal combustion engines for propulsion. Additionally, in search of reduced exhaust emissions, as well as for improved fuel efficiency, an internal combustion engine may be combined with one or more electric motor-generators to form a hybrid powertrain. A vehicle employing such a powertrain is generally termed a hybrid.

Cabin warm-up in motor vehicles is typically accomplished via electric heaters and/or via heat exchangers. Typically, the subject heat exchangers are coolant-to-air type, with the engine coolant being used to transfer heat energy to the air that is forced into the vehicle cabin. In certain situations when the vehicle cabin is required to be warmed up, the operation of the engine may be at odds with the desire to shut the engine off for improved vehicle efficiency.

SUMMARY

A method is disclosed for heating a cabin in a vehicle having an internal combustion engine employing a coolant to remove engine heat, and a heating ventilation and air conditioning (HVAC) system using the coolant to heat the cabin. In general, the method enables heating the cabin by prioritizing modes operation of the engine in response to whether the cabin temperature needs to be achieved or maintained. The method includes detecting a request to achieve a predetermined temperature inside the cabin.

The method also includes selecting a first baseline mode of operation of the engine to achieve the predetermined temperature inside the cabin. The method additionally includes selecting a second mode of operation of the engine if the predetermined temperature inside the cabin has not been achieved via the first baseline mode, and selecting a third mode of operation of the engine if the predetermined temperature inside the cabin has not been achieved via the second mode.

During the second mode of engine operation, the engine is run more frequently relative to the first baseline mode of operation to supply additional thermal energy to the coolant. During the third mode of engine operation, the engine is running and combustion of fuel in the engine is varied to supply additional thermal energy to the coolant.

The engine may employ an automatic engine shut-off and an automatic fuel cut-off. In such a case, the second mode of operation of the engine may include at least one of 1) disabling automatic engine shut-off and 2) disabling automatic fuel cut-off.

The vehicle may include an energy-storage device and the HVAC system may include an electric heater powered by the energy-storage device. In such a case the third mode of operation of the engine may include at least one of 1) combusting excess fuel and air inside the engine to generate a first level of excess engine power during relatively efficient engine operation and storing the generated first level of excess engine power as energy in the energy-storage device, 2) combusting excess fuel and air inside the engine to generate a second level of excess engine power during relatively inefficient engine operation and storing the generated second level of excess engine power as energy in the energy-storage device, and 3) retarding spark and continuing to burn fuel inside the engine such that additional thermal energy is supplied to the coolant.

The subject vehicle may additionally include a motor-generator.

The predetermined temperature may also be maintained via the method by supplying thermal energy to the coolant after the predetermined temperature has been achieved inside the cabin. In such a case, the method will include detecting a request to maintain the predetermined temperature. The method will then also include selecting a second baseline mode of operation of the engine to supply thermal energy to the coolant. The method will then additionally include selecting a fourth mode of operation of the engine wherein the engine is run more frequently relative to the second baseline mode of operation to supply additional thermal energy to the coolant if the predetermined temperature has not been maintained via the second baseline mode of operation. Additionally, the method may include selecting a fifth mode of operation of the engine wherein the engine is running and combustion of fuel in the engine is varied to supply additional thermal energy to the coolant if the predetermined temperature has not been maintained via the fourth mode of operation.

The fourth mode of operation of the engine may include at least one of 1) selecting from enabling and disabling fuel cut-off while supplying additional thermal energy to the coolant and maximizing combined operating efficiency of the engine, the motor-generator, and the energy-storage device during acceleration of the vehicle, 2) selecting from enabling and disabling engine shut-off while supplying additional thermal energy to the coolant and maximizing combined operating efficiency of the engine, the motor-generator, and the energy-storage device during acceleration of the vehicle, 4) selecting from enabling and disabling fuel cut-off while supplying additional thermal energy to the coolant and maximizing combined operating efficiency of the engine, the motor-generator, and the energy-storage device during deceleration of the vehicle, 5) disabling automatic fuel cut-off, and 6) disabling automatic engine shut-off.

The fifth mode of operation of the engine may include at least one of 1) combusting excess fuel and air inside the engine to generate a third level of excess engine power during relatively efficient engine operation and storing the generated third level of excess engine power as energy in the energy-storage device, 2) combusting excess fuel and air inside the engine to generate a fourth level of excess engine power during relatively inefficient engine operation and storing the generated fourth level of excess engine power as energy in the energy-storage device, and 3) retarding spark and continuing to burn fuel inside the engine such that additional thermal energy is supplied to the coolant.

The method may additionally include monitoring and comparing a desired temperature of the coolant and an actual temperature of the coolant. The comparison of the desired and actual temperatures of the coolant may be utilized to ascertain whether sufficient thermal energy is being supplied to the coolant via any of the selected modes of operation. Furthermore, the desired temperature of the coolant may be correlated to the predetermined temperature inside the cabin and the predetermined temperature inside the cabin may be achieved and maintained at least in part by respectively attaining and sustaining the desired temperature of the coolant.

Each of the acts of detecting the request to achieve and maintain the predetermined temperature inside the cabin, selecting a first and second baseline, the second, third, fourth, and the fifth modes of operation of the engine, and monitoring the desired temperature of the coolant and the actual temperature of the coolant may be accomplished via a controller.

A vehicle employing a controller to perform the above method is also disclosed. The controller may be additionally configured to select any of the first baseline, the second, and the third modes of operation of the engine if selection of the fifth mode of operation is insufficient to maintain the predetermined temperature inside the cabin.

The vehicle may be a hybrid type and may additionally include a motor-generator.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
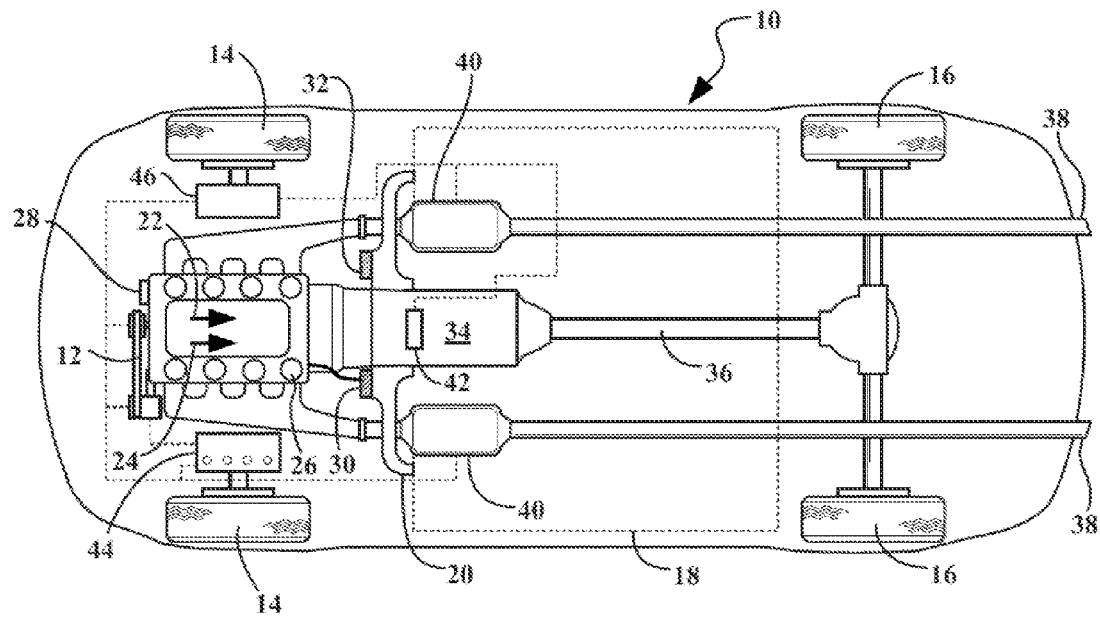
FIG. 1 is a schematic plan view of a hybrid vehicle using an internal combustion engine for heating the vehicle's cabin.

Referring to the drawings, wherein like reference numbers refer to like components, FIG. 1 shows a schematic view of a hybrid electric vehicle (HEV) 10. The HEV 10 includes an internal combustion engine 12, such as a spark or a compression ignition type engine, configured to generate power and adapted for driving wheels 14 and/or wheels 16 to propel the vehicle. Although a hybrid electric vehicle is shown, any vehicle employing an internal combustion engine is envisioned. The HEV 10 also includes a passenger compartment or cabin 18. The HEV 10 additionally includes a heating, ventilation, and air conditioning (HVAC) system 20 for regulating a flow of air at a selected temperature into and through the passenger compartment to establish a desired temperature inside the cabin 18.

The engine 12 is characterized by a start-stop capability, which includes an automatic engine shut-off and an automatic fuel cut-off. During a start-stop maneuver, the engine 12 is automatically shut off when engine power is not necessary to drive the HEV 10. Engine start-stop may be used to shut off the engine 12 in a situation when the HEV 10 comes to a brief stop and then be used to automatically restart the engine as the vehicle operator releases the brakes (not shown). Additionally, the start-stop capability allows the engine 12 to be shut off and motored by vehicle inertia during deceleration of the HEV 10 for improved fuel efficiency of the HEV, and then be automatically restarted when acceleration of the HEV is again desired. Generally, a supply of fuel 22 and air 24 is delivered to cylinders 26 of the engine 12 when the engine is running.

The start-stop capability of the engine 12 includes an automatic cut-off of the supply of fuel 22 to the cylinders 26 when the engine is not running. Typically, when a supply of fuel to an internal combustion engine is shut off and the engine is motored, the internal rotating components, such as the crankshaft, valves, and pistons (none of which are shown, but the existence of which would be appreciated by those skilled in the art) of the subject engine remain in motion. Consequently, the cylinders of the motored engine continue to generate vacuum, and then draw in, compress, and pump out air. Accordingly, because the subject engine does not burn fuel or generate combustion forces, the overall efficiency of the host vehicle is improved. The supply of fuel 22 is resumed to the cylinders 26 when the engine 12 is to be restarted.

As shown in FIG. 1, the engine 12 includes a fluid pump 28 configured to supply a pressurized cooling fluid or coolant and circulate such coolant throughout the engine to remove heat when the engine is running. The HVAC system 20 in turn uses the increased temperature engine coolant to heat the cabin 18 by having the coolant pass through a liquid-to-air heat exchanger 30 and directing thus heated air into the cabin. As also shown in FIG. 1, the HVAC system 20 may include an electric heater 32. The heater 32 is configured to supply thermal energy to the air entering the cabin 18 from the ambient in order to more rapidly achieve a desired temperature inside the cabin, especially when the engine 12 has not yet come up to operating temperature.

The engine 12 transmits power to the driven wheels 14 and/or 16 through a transmission 34 via a drive or a propeller shaft 36 for driving HEV 10. During operation, the engine 12 emits post-combustion gases to the ambient via an exhaust system 38. The exhaust system 38 includes catalytic converters 40 that are employed to reduce toxicity of the emitted exhaust gases prior to the gases entering the atmosphere, as understood by those skilled in the art. Accordingly, start-stop capability of the engine 12 also permits reduction of the exhaust gases into the atmosphere when engine power is not required to drive the HEV 10.

Still referring to FIG. 1, the HEV 10 additionally includes a motor-generator 42 configured to generate electrical power for driving the HEV and additionally supply such power to various electrical devices of the HEV. The motor-generator 42 is also configured to motor the engine 12 or quickly and automatically restart engine 12 after the engine has been briefly shut off during a start-stop maneuver. Although a single motor-generator 42 is shown, a great number of motor-generators may be employed depending on the actual configuration of the HEV 10. The motor-generator 42 is configured to supply energy to an energy-storage device 44, such as one or more batteries, when the engine 12 is running. The energy-storage device 44 typically also supplies electrical energy to power the HVAC system 20 and other miscellaneous vehicle accessories, such as vehicle exterior and interior lighting (not shown). The energy-storage device 44 is configured to selectively store energy, and to release the stored energy as required during operation of the HEV 10.

The HEV 10 also includes a controller 46 adapted to regulate operation of the engine 12, transmission 34, motor-generator 42, and energy-storage device 44. The controller 46 is configured to regulate heating of the cabin 18 by detecting a request from the operator of the HEV 10 to achieve a predetermined temperature inside the cabin. A request to achieve the predetermined temperature inside the cabin 18 occurs when the actual cabin temperature is below the desired cabin temperature. To accomplish the desired result, the controller 46 is configured to select a first baseline mode of operation of the engine 12.

If the predetermined temperature inside the cabin 18 has not been achieved via the first baseline mode of operation, the controller 46 then selects a second mode of operation of the engine 12. During the second mode of operation of the engine 12, the engine is run more frequently relative to the first baseline mode of operation to supply additional thermal energy to the coolant. Specifically, the second mode of operation of the engine 12 may include disabling automatic engine shut-off. Accordingly, during the second mode the automatic engine shut-off may be employed only below a predetermined speed of the HEV 10 or be disabled in all situations.

The second mode of operation of the engine 12 may also include disabling the automatic fuel cut-off. In general, driving the HEV 10 by the motor-generator 42 while spinning or motoring the engine 12 and saving fuel via automatic fuel cut-off to the cylinders 26 may be a more efficient means of accelerating the HEV. On the other hand, disabling the automatic fuel cut-off during acceleration of the HEV 10 may be more effective from the standpoint of total efficiency of the HEV when additional thermal energy needs to be generated for increasing temperature inside the cabin 18. For example, it may be more efficient for the engine 12 to burn fuel to generate additional power instead of energy being dissipated at a faster rate in the energy-storage device 44 and by the motor-generator 42. If the predetermined temperature inside the cabin 18 has not been achieved via the second mode of operation, the controller 46 may then select a third mode of operation of the engine 12 to supply additional thermal energy to the coolant. During the third mode of operation of the engine 12, the engine is already running and combustion of fuel in the engine is varied to generate additional thermal energy.

The third mode of operation of the engine 12 may include combusting excess fuel and air inside the cylinders 26 to generate a first level of excess engine power during relatively efficient engine operation and storing the generated first level of excess engine power as energy in the energy-storage device 44. Accordingly, the first level of excess engine power remains when only a portion of the power produced by the engine 12 during relatively efficient engine operation is utilized for driving the HEV 10. The third mode of operation of the engine 12 may also include combusting excess fuel and air inside the cylinders 26 to generate a second level of excess engine power during relatively inefficient engine operation and storing the generated second level of excess engine power as energy in the energy-storage device 44. Therefore, the second level of excess engine power remains when only a portion of the power produced by the engine 12 during relatively inefficient engine operation is utilized for driving the HEV 10.

Typically, relatively efficient manner of operation of the engine 12 generates an optimized amount of power for the supplied amount of fuel along with the least amount of heat while the engine is operating at an optimum speed/load point. Such optimized engine operation at every speed/load point is generally termed as the lowest brake specific fuel consumption (BSFC) and is defined as the lowest rate of fuel consumption divided by the maximum power produced, as understood by those skilled in the art. Generally, the lowest BSFC is generated at specific spark timing relative to the position of each cylinder 26 during the engine's combustion cycle.

The relatively inefficient manner of operation of the engine 12 may generate either less than optimized amount of power per the supplied amount of fuel, i.e., increased BSFC, or generate optimized but greater than required amount of power. In either situation, an increased amount of heat relative to the efficient manner of operation of the engine 12 is produced. Specifically, the increased BSFC may be generated at a speed/load point that is altered in comparison to the optimum speed/load point used for the relatively efficient engine operation described above. Consequently, the altered speed/load point is enabled by the excess supply of fuel and air. In such a case, the engine 12 is still operated at optimized spark timing, but is made to generate excess power from the additional fuel and air. In other words, during the third mode of operation of the engine 12, the engine generates the requested amount of power to drive the HEV 10, while the engine's fuel consumption and the generated amount of heat are both increased. The increased amount of heat from the generated excess power is then channeled to the engine coolant to increase the temperature of the air supplied to the cabin 18 by the HVAC system 20.

As such, during the third mode of operation of engine 12, the engine may be operated to produce either efficiently or inefficiently a greater amount of power than is requested by the operator. Additionally, the respective first or second level of generated excess power from the engine 12 may also be diverted to charge the energy-storage device 44. Furthermore, the third mode of operation of the engine 12 may include retarding spark for igniting and continuing to burn fuel inside the cylinders 26 such that additional thermal energy is supplied to the engine coolant. A reduced amount of power per the supplied amount of fuel may then be generated at retarded spark timing as compared with the spark timing used during the efficient manner of operation of the engine 12. In such a case, the third mode of operation may also include continuing to burn the mixture of fuel 22 and air 24 inside the cylinders 26 such that the engine 12 generates additional heat. Accordingly, such retarding of the spark for igniting the mixture of fuel 22 and air 24 serves to supply additional thermal energy to the engine coolant and increases the temperature of the air supplied to the cabin 18 by the HVAC system 20.

The controller 46 may be additionally programmed to monitor a desired temperature of the coolant and an actual temperature of the coolant during the first baseline, second, and third modes of engine operation, and compare the two temperatures. Such monitoring and comparison of coolant temperatures may then be employed to ascertain whether sufficient thermal energy is being supplied to the coolant via the selected mode(s) of operation, as well as whether the predetermined temperature inside the cabin has been achieved. Also, the comparison of the desired coolant temperature versus the actual coolant temperature may then used by the controller 46 to additionally prioritize selection of the first baseline through the third mode of engine operation of the engine 12 when the request is received to achieve the predetermined temperature inside the cabin 18.

Therefore, consistent with the operation of the HVAC system 20 described above, the predetermined temperature inside the cabin 18 is achieved by increasing a predetermined desired temperature of the engine coolant. Furthermore, the controller 46 may select any of the first baseline through the third mode of engine operation when the output of the electric heater 32 is insufficient to generate an acceptably rapid rise of temperature in the cabin 18. The controller 46 may also select the first baseline through the third mode of engine operation when the energy-storage device 44 is significantly depleted of electric charge, and therefore the heater 32 cannot be suitably operated.

After the predetermined temperature has been achieved inside the cabin 18, the predetermined temperature may then be maintained via the controller 46. Similar to actions employed to achieve the predetermined temperature inside cabin 18, the temperature inside the cabin may be maintained by supplying a desired amount of thermal energy to the engine coolant. Accordingly, the request to maintain the predetermined temperature inside the cabin 18 may be detected by the controller 46 when the actual cabin temperature commences to drop from the desired level. To accomplish the desired result, the controller 46 is configured to initially select a second baseline mode of operation of the engine 12 in order to supply thermal energy to the coolant.

If the predetermined temperature has not been maintained via the second baseline mode of operation, the controller 46 may select a fourth mode of operation of the engine 12. In the fourth mode of engine operation, the engine 12 is run more frequently relative to the second baseline mode of operation to supply additional thermal energy to the coolant. The fourth mode of operation of the engine 12 may include actively selecting from enabling and disabling cut-off of the supply of fuel 22 to the engine while supplying additional thermal energy to the coolant. The enabling or disabling the cut-off of the supply of fuel 22 may be continuously selected while, at the same time, the combined operating efficiency of the engine 12, the motor-generator 42, and the energy-storage device 44 is maximized during acceleration of the HEV 10. Effectively, the controller 46 is programmed to bias in favor of not selecting fuel cut-off such that operator requests for acceleration of the HEV 10 may be met during the subject selection between enabling and disabling cut-off of the supply of fuel 22.

The fourth mode of operation of the engine 12 may also include actively selecting from enabling and disabling engine shut-off by the controller 46 while supplying additional thermal energy to the coolant. Selecting between enabling and disabling engine shut-off may be accomplished continuously while maximizing the combined operating efficiency of the engine 12, the motor-generator 42, and the energy-storage device 44 during acceleration of the HEV 10. Effectively, the controller 46 is programmed to bias in favor of selecting engine on and not selecting engine shut-off such that operator requests for acceleration of the HEV 10 may be met. The fourth mode of operation of the engine 12 may also include actively selecting from enabling and disabling fuel cut-off while supplying additional thermal energy to the coolant and maximizing combined operating efficiency of the engine 12, the motor-generator 42, and the energy-storage device 44 during deceleration of the HEV 10. Effectively, the controller 46 is programmed to bias in favor of not selecting fuel cut-off on deceleration of the HEV 10 in order for the engine 12 to generate additional thermal energy.

The fourth mode of operation of the engine 12 may also include fully disabling automatic fuel cut-off and/or fully disabling automatic engine shut-off by the controller 46. Such unconditional disabling of the fuel cut-off and/or the automatic engine shut-off may be used to assure the generation of additional thermal energy by the engine 12 in all conditions.

Additionally, the controller 46 may be programmed to select a fifth mode of operation of the engine 12, wherein the engine is already turned on and running. During the fifth mode of operation of the engine 12, combustion of fuel in the engine is varied to supply additional thermal energy to the coolant if the predetermined temperature has not been maintained via the fourth mode of operation. Similar to the third mode of engine operation when the predetermined temperature in the cabin 18 is achieved, the fifth mode of operation of the engine may include combusting excess fuel and air inside the cylinders 26.

The fifth mode may combust excess fuel and air to generate a third level of excess engine power during relatively efficient engine operation and storing the generated third level of excess engine power as energy in the energy-storage device 44. The fifth mode may also include combusting excess fuel and air inside the cylinders 26 to generate a fourth level of excess engine power during relatively inefficient engine operation and storing the generated fourth level of excess engine power as energy in the energy-storage device 44. As described above, excess engine power remains when only a portion of the power produced by the engine 12 is utilized for driving the HEV 10. Although the actual amount of excess engine power generated during the relatively efficient engine operation and the relatively inefficient engine operation of the fifth mode may be different from that generated during the third mode, the fundamental approach is as described above with respect to the third mode. Additionally, like in the third mode of operation of the engine 12, the fifth mode may also include retarding spark and continuing to burn fuel inside the cylinders 26 such that additional thermal energy is supplied to the engine coolant.

As during achieving the predetermined temperature in the cabin 18, the controller 46 may monitor a desired temperature of the engine coolant that is correlated to the predetermined cabin temperature that is sought to be maintained. Accordingly, the comparison between the desired temperature and actual temperatures of the engine coolant to be performed by the controller 46 may then be used to ascertain in real time whether sufficient thermal energy is being supplied to the coolant via any of the selected second baseline through fifth mode of engine operation.

The comparison of the desired coolant temperature versus the actual coolant temperature may also be used by the controller 46 to prioritize selection of the second baseline through the fifth mode of operation of the engine 12 when the request is received to maintain the predetermined temperature inside the cabin 18. Therefore, consistent with the operation of the HVAC system 20 described above, the predetermined temperature inside the cabin 18 is maintained by sustaining a predetermined desired temperature of the engine coolant. As such, the controller 46 prioritizes the second baseline through the fifth mode of operation of the engine 12 to appropriately heat the cabin 18 in response to whether the cabin temperature needs to be either achieved or maintained. Furthermore, the prioritization of the second baseline through the fifth mode of the engine 12 is based on progressively reducing operational efficiency of the engine 12. Accordingly, the controller 46 is programmed to maintain maximum fuel economy of the engine 12 in light of the heating requirements of the cabin 18.

In the event that selection of the second baseline through the fifth modes of operation is assessed to be insufficient to maintain the desired temperature within the cabin 18, the controller 46 may select and prioritize the first baseline through third modes of engine operation to generate a more rapid increase in coolant temperature. As such, the predetermined temperature inside the cabin 18 may be achieved and maintained at least in part by respectively attaining and sustaining a predetermined temperature of the engine coolant.

Figure 2:
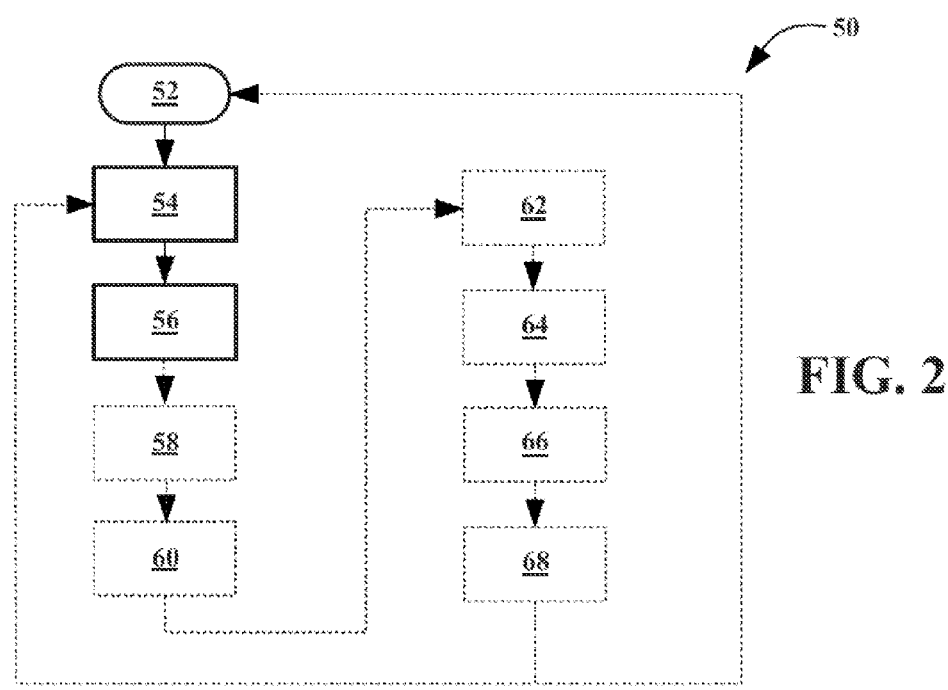
FIG. 2 is a flow chart illustrating a method of heating the cabin in the vehicle depicted in FIG. 1.

FIG. 2 depicts a method 50 of heating the cabin 18 in the HEV 10, as described above with respect to FIG. 1. The method 50 enables heating the cabin 18 by prioritizing modes operation of the engine 12 in response to whether the cabin temperature needs to be achieved or maintained. The method commences in frame 52 with the HEV 10 being activated by the vehicle operator. From frame 52, the method proceeds to frame 54, where the method includes detecting a request to achieve a predetermined temperature inside the cabin 18 via the controller 46. After frame 54, the method advances to frame 56 where the method includes selecting via the controller 46 the first baseline mode of operation of the engine 12 to achieve the predetermined temperature inside the cabin 18. From frame 56 the method may move on to frame 58. In frame 58 the method includes selecting via the controller 46 the second mode of operation of the engine 12 if the predetermined temperature has not been achieved via the first baseline mode of operation.

From frame 58 the method may proceed to frame 60. In frame 60 the method may include selecting via the controller 46 the third mode of operation of the engine 12 if the predetermined temperature has not been achieved via the second mode of operation. After the frame 60, the method may advance to frame 62. In frame 62 the method may include detecting via the controller 46 a request to maintain the predetermined temperature inside the cabin 18. Additionally, from frame 62 the method may move on to frame 64 where the method includes selecting the second baseline mode of operation of the engine 12 via the controller 46 to maintain the predetermined temperature inside the cabin 18. Following frame 64, the method may proceed to frame 66 where the method includes selecting via the controller 46 the fourth mode of operation of the engine 12 if the predetermined temperature inside the cabin 18 has not been achieved via the second baseline mode of operation.

Following frame 66, the method may advance to frame 68 where the method includes selecting via the controller 46 the fifth mode of operation of the engine 12 if the predetermined temperature inside the cabin 18 has not been achieved via the fourth mode of operation. Additionally, after frame 68 the method may revert to frames 54-60 and select via the controller 46 any of the first baseline, the second, and the third modes of operation of the engine 12 if the selection of the fifth mode of operation in frame 68 was insufficient to maintain the predetermined temperature inside the cabin 18. The method 50 may be completed and loop back to frame 52 after the HEV 10 has been shut off and later restarted.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of achieving a temperature in a cabin of a hybrid vehicle having an internal combustion engine employing a coolant to remove engine heat, and a heating ventilation and air conditioning (HVAC) system using the coolant to heat the cabin, the method comprising:
   detecting a request to achieve a predetermined temperature inside the cabin;
   selecting a first baseline mode of operation of the engine to supply thermal energy to the coolant;
   selecting a second mode of operation of the engine wherein the engine is run more frequently relative to the first baseline mode of operation to supply additional thermal energy to the coolant if the predetermined temperature has not been achieved via the first baseline mode of operation; and
   selecting a third mode of operation of the engine wherein the engine is running and combustion of fuel in the engine is varied to supply additional thermal energy to the coolant if the predetermined temperature has not been achieved via the second mode of operation;
   wherein each of said detecting the request to achieve the predetermined temperature inside the cabin, selecting the first baseline, the second, and the third modes of operation of the engine, and monitoring the desired temperature of the coolant and the actual temperature of the coolant is accomplished via a controller.

2. The method of claim 1, wherein the engine employs an automatic engine shut-off and an automatic fuel cut-off, and the second mode of operation of the engine includes at least one of:
   disabling automatic engine shut-off; and
   disabling automatic fuel cut-off.

3. The method of claim 1, wherein the vehicle includes an energy-storage device and the HVAC system includes an electric heater powered by the energy-storage device, and the third mode of operation of the engine includes at least one of:
   combusting excess fuel and air inside the engine to generate a first level of excess engine power during relatively efficient engine operation and storing the generated first level of excess engine power as energy in the energy-storage device;
   combusting excess fuel and air inside the engine to generate a second level of excess engine power during relatively inefficient engine operation and storing the generated second level of excess engine power as energy in the energy-storage device; and
   retarding spark and continuing to burn fuel inside the engine such that additional thermal energy is supplied to the coolant.

4. The method of claim 1, further comprising monitoring and comparing a desired temperature of the coolant and an actual temperature of the coolant to ascertain whether sufficient thermal energy is being supplied to the coolant via any of the selected modes of operation, and wherein the predetermined temperature inside the cabin is achieved at least in part by attaining the desired temperature of the coolant.

5. The method of claim 1, wherein the vehicle additionally includes a motor-generator.

6. A method of maintaining temperature in a cabin of a hybrid vehicle having an internal combustion engine employing a coolant to remove engine heat, and a heating ventilation and air conditioning (HVAC) system using the coolant to heat the cabin, the method comprising:
   detecting a request to maintain a predetermined temperature inside the cabin;
   selecting a second baseline mode of operation of the engine to supply thermal energy to the coolant;
   selecting a fourth mode of operation of the engine wherein the engine is run more frequently relative to the second baseline mode of operation to supply additional thermal energy to the coolant if the predetermined temperature has not been maintained via the second baseline mode of operation; and
   selecting a fifth mode of operation of the engine wherein the engine is running and combustion of fuel in the engine is varied to supply additional thermal energy to the coolant if the predetermined temperature has not been maintained via the fourth mode of operation;
   wherein each of said detecting the request to maintain the predetermined temperature inside the cabin, selecting the second baseline, the fourth, and the fifth modes of operation of the engine, and monitoring the desired temperature of the coolant and the actual temperature of the coolant is accomplished via a controller.

7. The method of claim 6, wherein the engine employs an automatic fuel cut-off and an automatic engine shut-off, the vehicle additionally includes a motor-generator and an energy storage device, and the fourth mode of operation of the engine includes at least one of:
   selecting from enabling and disabling fuel cut-off while supplying additional thermal energy to the coolant and maximizing combined operating efficiency of the engine, the motor-generator, and the energy-storage device during acceleration of the vehicle;
   selecting from enabling and disabling engine shut-off while supplying additional thermal energy to the coolant and maximizing combined operating efficiency of the engine, the motor-generator, and the energy-storage device during acceleration of the vehicle;
   selecting from enabling and disabling fuel cut-off while supplying additional thermal energy to the coolant and maximizing combined operating efficiency of the engine, the motor-generator, and the energy-storage device during deceleration of the vehicle;
disabling automatic fuel cut-off; and
disabling automatic engine shut-off.

8. The method of claim 6, wherein the vehicle includes an energy-storage device and the HVAC system includes an electric heater powered by the energy-storage device, and the fifth mode of operation of the engine includes at least one of:
combusting excess fuel and air inside the engine to generate a third level of excess engine power during relatively efficient engine operation and storing the generated third level of excess engine power as energy in the energy-storage device;
combusting excess fuel and air inside the engine to generate a fourth level of excess engine power during relatively inefficient engine operation and storing the generated fourth level of excess engine power as energy in the energy-storage device; and
retarding spark and continuing to burn fuel inside the engine such that additional thermal energy is supplied to the coolant.

9. The method of claim 6, further comprising monitoring a desired temperature of the coolant and an actual temperature of the coolant to ascertain whether sufficient thermal energy is being supplied to the coolant via any of the selected modes of operation, and wherein the predetermined temperature inside the cabin is maintained at least in part by sustaining the desired temperature of the coolant.

10. A vehicle comprising:
a vehicle cabin;
an internal combustion engine employing a coolant to remove engine heat;
a heating ventilation and air conditioning (HVAC) system using the coolant to heat the cabin; and
a controller configured to regulate heating of the cabin by:
detecting a request to achieve a predetermined temperature inside the cabin;
selecting a first baseline mode of operation of the engine to supply thermal energy to the coolant;
selecting a second mode of operation of the engine wherein the engine is run more frequently relative to the first baseline mode of operation to supply additional thermal energy to the coolant if the predetermined temperature has not been achieved via the first baseline mode of operation;
selecting a third mode of operation of the engine wherein the engine is running and combustion of fuel in the engine is varied to supply additional thermal energy to the coolant if the predetermined temperature has not been achieved via the second mode of operation;
detecting a request to maintain a predetermined temperature inside the cabin after the predetermined temperature has been achieved;
selecting a second baseline mode of operation of the engine to supply thermal energy to the coolant;
selecting a fourth mode of operation of the engine wherein the engine is run more frequently relative to the second baseline mode of operation to supply additional thermal energy to the coolant if the predetermined temperature has not been maintained via the second baseline mode of operation; and
selecting a fifth mode of operation of the engine wherein the engine is running and combustion of fuel in the engine is varied to supply additional thermal energy to the coolant if the predetermined temperature has not been maintained via the fourth mode of operation.

11. The vehicle of claim 10, wherein the controller is additionally configured to monitor a desired temperature of the coolant and an actual temperature of the coolant, and compare the desired and actual temperatures of the coolant to ascertain whether sufficient thermal energy is being supplied to the coolant via any one of the selected first baseline, second, and third modes of operation to attain the desired temperature of the coolant and achieve the predetermined temperature inside the cabin.

12. The vehicle of claim 11, wherein the controller is additionally configured to compare the desired and actual temperatures of the coolant to ascertain whether sufficient thermal energy is being supplied to the coolant via any one of the selected second baseline, fourth, and fifth modes of operation to sustain the desired temperature of the coolant and maintain the predetermined temperature inside the cabin.

13. The vehicle of claim 10, wherein the engine employs an automatic engine shut-off and an automatic fuel cut-off, and the second mode of operation of the engine includes at least one of:
disabling automatic engine shut-off; and
disabling automatic fuel cut-off.

14. The vehicle of claim 12, wherein the vehicle includes an energy-storage device and the HVAC system includes an electric heater powered by the energy-storage device, and the third mode of operation of the engine includes at least one of:
combusting excess fuel and air inside the engine to generate a first level of excess engine power during relatively efficient engine operation and storing the generated first level of excess engine power as energy in the energy-storage device;
combusting excess fuel and air inside the engine to generate a second level of excess engine power during relatively inefficient engine operation and storing the generated second level of excess engine power as energy in the energy-storage device; and
retarding spark and continuing to burn fuel inside the engine such that additional thermal energy is supplied to the coolant.

15. The vehicle of claim 10, wherein the engine employs an automatic fuel cut-off and an automatic engine shut-off, the vehicle additionally includes a motor-generator and an energy-storage device, and the fourth mode of operation of the engine includes at least one of:
selecting from enabling and disabling fuel cut-off while supplying additional thermal energy to the coolant and maximizing combined operating efficiency of the engine, the motor-generator, and the energy-storage device during acceleration of the vehicle;
selecting from enabling and disabling engine shut-off while supplying additional thermal energy to the coolant and maximizing combined operating efficiency of the engine, the motor-generator, and the energy-storage device during acceleration of the vehicle;
selecting from enabling and disabling fuel cut-off while supplying additional thermal energy to the coolant and maximizing combined operating efficiency of the engine, the motor-generator, and the energy-storage device during deceleration of the vehicle;
disabling automatic fuel cut-off; and
disabling automatic engine shut-off.

16. The vehicle of claim 15, wherein the fifth mode of operation of the engine includes at least one of:
combusting excess fuel and air inside the engine to generate a third level of excess engine power during relatively efficient engine operation and storing the generated third level of excess engine power as energy in the energy-storage device;

combusting excess fuel and air inside the engine to generate a fourth level of excess engine power during relatively inefficient engine operation and storing the generated fourth level of excess engine power as energy in the energy-storage device; and retarding spark and continuing to burn fuel inside the engine such that additional thermal energy is supplied to the coolant.

17. The vehicle of claim 16, further comprising selecting any one of the first baseline, the second, and the third modes of operation if the predetermined temperature inside the cabin has not been maintained via the fifth mode of operation.

18. The vehicle of claim 10, the controller is additionally configured to select any of the first baseline, the second, and the third modes of operation of the engine if selection of the fifth mode of operation is insufficient to maintain the predetermined temperature inside the cabin.

* * * * *